(12) United States Patent
Osman

(10) Patent No.: US 12,654,098 B2
(45) Date of Patent: Jun. 16, 2026

(54) MANAGING SHARED ACCOUNT ACCESS

(71) Applicant: Sony Interactive Entertainment Inc., Tokyo (JP)

(72) Inventor: Steven Osman, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 624 days.

(21) Appl. No.: 17/942,083

(22) Filed: Sep. 9, 2022

(65) Prior Publication Data

US 2024/0082714 A1     Mar. 14, 2024

(51) Int. Cl.
*A63F 13/533*        (2014.01)
*A63F 13/355*        (2014.01)
*A63F 13/79*         (2014.01)

(52) U.S. Cl.
CPC .......... *A63F 13/533* (2014.09); *A63F 13/355* (2014.09); *A63F 13/79* (2014.09)

(58) Field of Classification Search
CPC ...... A63F 13/533; A63F 13/355; A63F 13/79; G06F 21/6218; G06F 21/316
See application file for complete search history.

(56) References Cited

U.S. PATENT DOCUMENTS

| | | | |
|---|---|---|---|
| 2009/0177979 A1 | 7/2009 | Garbow et al. | |
| 2016/0148009 A1* | 5/2016 | Amacker | .............. G06F 21/629 |
| | | | 726/26 |
| 2021/0234866 A1 | 7/2021 | Michalowitz et al. | |

OTHER PUBLICATIONS

Intl Search Report and Written Opinion, PCT/US2023/073592, dated Oct. 27, 2023, 11 pages.

* cited by examiner

*Primary Examiner* — Peter J Iannuzzi
(74) *Attorney, Agent, or Firm* — Kilpatrick Townsend & Stockton LLP

(57)     ABSTRACT

Methods and systems for warning misuse of a user account of an adult user includes tracking use of the user account. The interactions at the user account are monitored and when the content accessed by a user is adult content and the user is determined to be a child, providing an alert to the adult user informing the adult user of the child accessing age-inappropriate content.

20 Claims, 6 Drawing Sheets

Details included in the notification to adult user provided periodically

265a

| User ID/ profile | Content ID/ type | Content rating | Access time/ resident period | Interactions provided | Alert/alert level |
|---|---|---|---|---|---|
| User A1 (6 yrs old) | Content a12/ video game | Adult (extreme violence) | 9:00 pm (60 mins) | Spectated | High |
| User B1 (13 yrs old) | Content a123/ streaming content | Adult (violence and swearing) | 11:00 am (70 mins) | Spectated gameplay and provided some social interactions | High |
| User C1 (17 yrs old) | Content a123/ streaming content | Adult (violence and swearing) | 11:00 pm (10 mins) | Interacted (viewed & socially interacted) | Low (due to age, time spent, interaction) |
| -------------- | -------------- | -------------- | -------------- | -------------- | -------------- |

Figure 3A

Figure 3B:
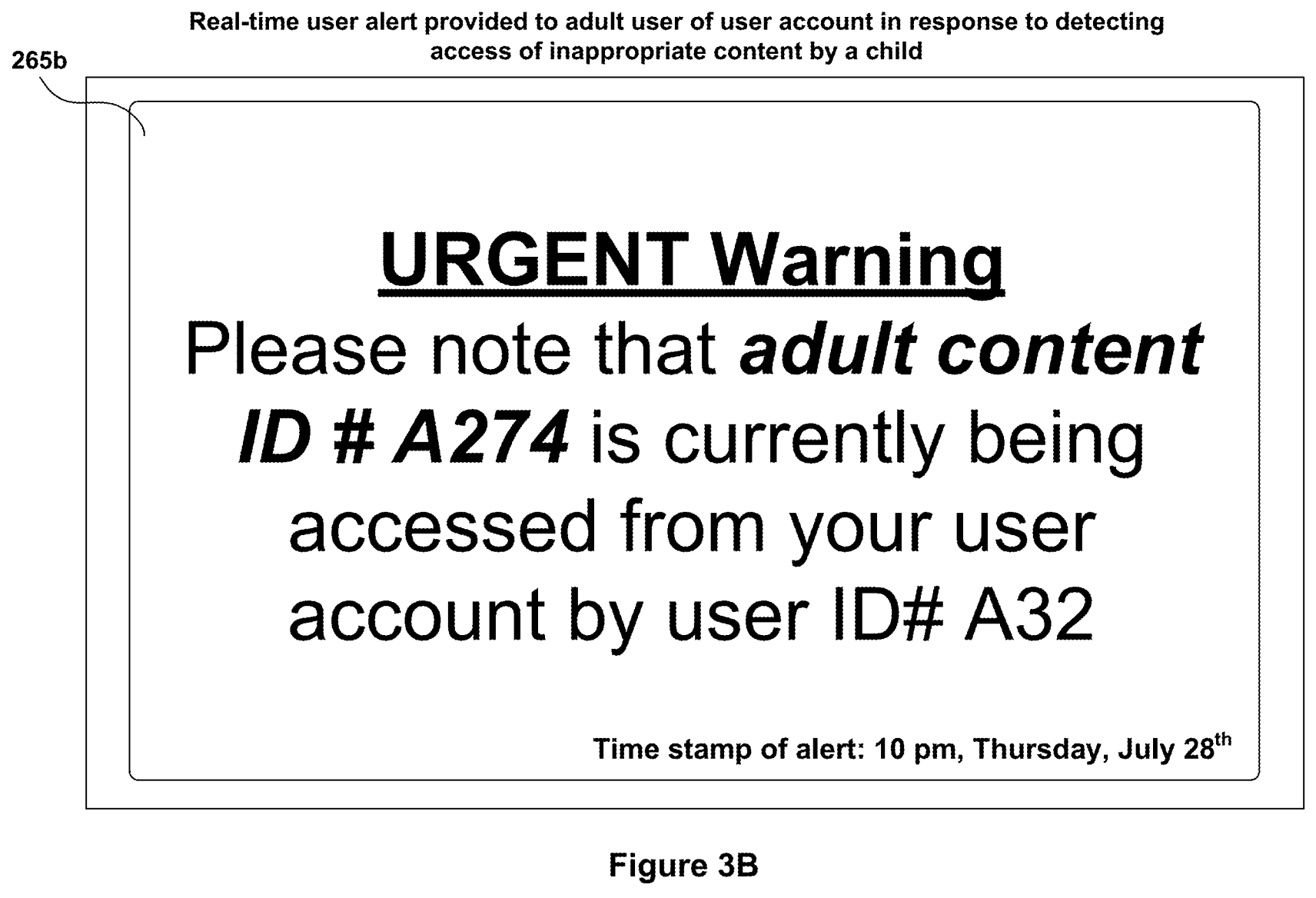

Real-time user alert provided to adult user of user account in response to detecting access of inappropriate content by a child

<u>URGENT Warning</u>

Please note that *adult content ID # A274* is currently being accessed from your user account by user ID# A32

Time stamp of alert: 10 pm, Thursday, July 28th

MANAGING SHARED ACCOUNT ACCESS

TECHNICAL FIELD

The present disclosure relates to monitoring a user account of an adult user and providing alerts when a child user accesses adult content from the user account of the adult user.

BACKGROUND OF THE DISCLOSURE

With the growing number of content available on-line, users are constantly seeking ways to access more and more of such content. Some of the content is available for free while other content are available through a subscription service. To access the subscription related content, the user sets up a user account with the subscription service. Oftentimes, in order to save money or to centralize access, the user may share their user account credentials with other users within a group, such as within a household, a friend circle, etc. Some of the content can be suitable for consumption for all ages of users while other content may be suitable for consumption for select age groups as they may contain age-appropriate content. The user who is sharing their user account will have to ensure that each user who accesses the content available to the user account is only accessing age-appropriate content.

It is in this context that the embodiments of the disclosure arise.

SUMMARY

Implementations of the present disclosure relate to systems and methods for monitoring a user account of an adult user and to provide warnings when a child is accessing adult content from the user account of the adult user.

In one implementation, a method for warning misuse of a user account of an adult user is disclosed. The method includes tracking use of the user account of the adult user. The user account is configured to provide access to a plurality of content, including one or more video games, to a plurality of users. Interactions at the user account of the adult user are monitored to identify content accessed by the plurality of users. When the content accessed by a user is adult content and the user is determined to be a child, an alert is provided to inform the adult user of the child accessing the adult content via the user account of the adult user.

In another implementation, a system to warn misuse of a user account of an adult user is disclosed. The system includes a memory to store operations for identifying content accessed by different users of the user account and for warning the adult user, and a processor for executing the operations. The processor is configured to execute the operations to, track use of the user account of the adult user; monitor interactions at the user account of the adult user to identify content accessed by the plurality of users; and when the content detected to be accessed by a user is adult content and the user is detected to be a child, generate an alert to inform the adult user of the child accessing the adult content from the user account of the adult user.

The alert provides the adult user with information on when the child accessed the user account and specific adult content that the child accessed, which is inappropriate for their age, so that the adult user can take appropriate actions to minimize exposure of such content to the child. The system provides continuous monitoring of the adult account including providing a list of users who are accessing the user account. Thus, when a child is detected to be accessing the adult user's account, the system keeps track of all the content, including video games, streaming content, etc., that the child is accessing. The frequency or prompt/delayed notification to the adult user can be dependent on the type of content that is being accessed by the child, the amount of time spent by the child in consuming the content, the frequency of access, and the rating of the content.

In addition to alerting the adult user regarding the child's viewing and interaction behavior, the system is used to restrict access to the child so that the child is provided access to only age-appropriate content when the child is accessing the content from an adult user account.

Other aspects and advantages of the disclosure will become apparent from the following detailed description, taken in conjunction with the accompanying drawings, illustrating by way of example the principles of various implementations described in the present disclosure.

BRIEF DESCRIPTION OF THE DRAWINGS

The disclosure may best be understood by reference to the following description taken in conjunction with the accompanying drawings.

FIGS. 3A and 3B illustrate sample alerts that are provided to the adult user upon detecting a child accessing adult content via the user account of the adult user, in accordance with some implementations of the present disclosure.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process operations have not been described in detail in order not to unnecessarily obscure various implementations of the present disclosure.

Figure 1:
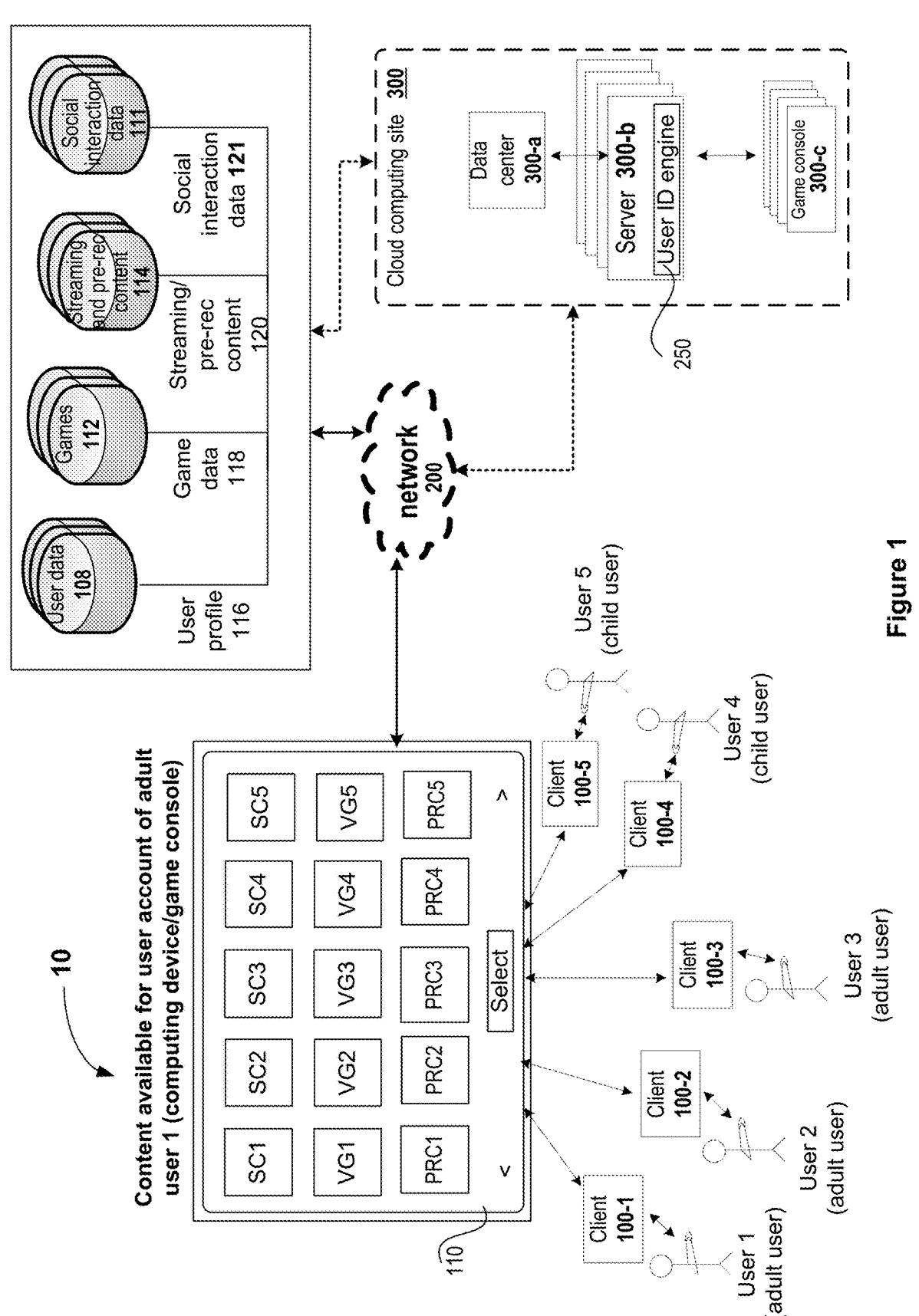
FIG. 1 provides a simplified block diagram of a system that engages user identification engine that is used to track use of a user account of an adult user and alert the adult user when a child is accessing adult content from the user account, in accordance with one implementation of the present disclosure.

FIG. 1 illustrates an implementation of a system 10 used to set up a user account of a user and to monitor the user account for any misuse of content by another user. A user account can be established by a user to access a plurality of content available at the system 10. The content can include generic content available to all users and specific content that is available through subscription to a subscription service. The content can include pre-recorded content, video games, social interactions, and/or streaming content, wherein the content is user-generated content or provided by content provider. FIG. 1 shows some of the content that can be accessed via the user account of user 1, wherein the content can include only subscription content, or generic as well as subscription content. A sample set of content that can be accessed from user account of user 1 is rendered on a display screen 110 of a client device 100-1 of user 1 that is used to set up and access content available to the user account. For example, user account of user 1 is set up to access streaming content SC1-SC5 (120) retrieved from streaming and pre-rec content datastore 114, video games VG1-VG5 (118) from games datastore 112, pre-recorded content PRC1-PRC5 (120) from streaming and pre-rec content datastore 114, and social interaction data 121 from social interaction datastore 111, to name a few, wherein the content at the respective datastore are uploaded by one or more users and/or content providers, for example. Additional content can be accessed using the right or left arrow shown at the bottom of display screen 110. Some of the content accessed through the user account, depending on the age of the user, can include adult-appropriate content, child appropriate content, as well as generic content that can be consumed by all users. The content can be designated as adult-appropriate based on context, violence, sexual content, language, violent or gory scenes, intensity, etc., of content contained within, and such designation can be provided by a rating authority, content provider, content sponsor, or by the user.

The user account of user 1 is set up using user credentials, such as user name, age, gender, etc., provided by user 1, for example. Alternately or additionally, biometric data of the user can be captured using various sensors (image sensors, audio sensors, etc.) available at the client device 100-1 used to set up the user account of user 1, and used for further verification of user 1. Based on the user credentials provided by user 1, user 1 is designated as an adult user. The user is designated an adult user as the user credentials of user 1 indicate that user 1 is at least 18 years old. The user credentials of user 1 are saved as user profile 116 in user datastore 108 and retrieved for subsequent verification of user 1, whenever user 1 accesses the user account for interacting with the content.

The user account of user 1 can be accessed by a plurality of users, user 2-user 5. In some implementations, the user account can be set up by user 1 as a head of a household and access to the user account can be provided to other members of the household to allow them to interact with the content available to the user account. User credentials captured during set-up of the user account or during interaction with the content can be used to establish each user as an adult user or a child user. For example, based on the user credentials captured at the user account, users 2 and 3 are identified as adult users and users 4 and 5 are identified as child users.

In some implementations, the user account of user 1 is stored locally in a computing device or game console and accessed by users 1-5 using a client device 100. In some implementations, users 1-5 can access the user account and interact with content using a single client device 100. In alternate implementations, each user can access the user account using a respective client device 100-1 through 100-5, wherein each of the client devices 100-1 through 100-5 can be a distinct computing device or a game console. In another implementation, two or more users can share a client device 100 and more than one client device can be used to access the user account of user 1. Further, users 1-5 can interact with the content selected via the user account of user 1 using one or more input devices, such as a controller, a keyboard, a mouse, a voice activated device, etc., wherein the input devices can be associated with client devices 100-1 through 100-5. Further, the input devices can depend on the client devices selected for interacting. Inputs provided by the input devices can be used to affect a state of interactive applications, such as the video game, and or to determine what content is to be rendered at a display screen associated with the respective client devices.

In some implementations, the user account of user 1 is stored locally within a game console or computing device and content available to the user account is stored remotely in various datastores (108, 112, 114 and 111) and accessed directly over a network 200. In alternate implementations, the user account of user 1 is stored on a cloud computing site 300 and accessed over a network 200. A server on the cloud computing site 300 is then used to query and retrieve the content for the user account from various datastores over the network. The retrieved content is then packaged and returned to the client device by the cloud computing site 300 over the network 200. The cloud computing site 300 can include one or more data centers 300-*a*, with each data center 300-*a* having one or more servers 300-*b* that can be used to execute video games and provide game content. Each server 300-*b* can include a plurality of game consoles 300-*c*, with each game console configured to execute one or more instances of a single or multiple video games. In addition to video game content, other streaming, pre-recorded and/or social interaction content stored in various datastores can also be retrieved by the server 300-*b*, packaged and forwarded to respective client devices for rendering.

Game inputs for the video game, for example, provided by the user using the input devices can be routed through the client device 100 to the server 300-*b* at the cloud computing site 300 over the network 200 and the game content generated from the game inputs is forwarded to the client device 100 for rendering on a display screen 110 coupled to the client device 100. In alternate implementations, the input devices can be directly coupled to the server 300-*b* of the cloud computing site 300 via the network 200 and the game inputs, for example, from the input devices are directly transmitted to the server 300-*b* for affecting the state of the video game executing on the server 300-*b*. Content of the video game generated at the server 300-*b* are transmitted to the client device 100 for rendering at the display screen 110.

A user identification engine 250 executes on a server 300-*b* of the cloud computing site 300, for example, and is configured to detect a user accessing a user account of an adult user. Responsive to the detection, the user identification engine 250 is configured to determine the user credentials, including the age of the user, and the content that the user is trying to access or has accessed during a certain period. When the user credentials identify the user accessing the user account as a child and the content accessed is adult content then the user identification engine 250 is used to send out an alert to the adult user of the user account through which the child is accessing the adult content to warn the adult user. The alert is provided so that the adult user can take precautionary measure to prevent the child from accessing the adult content. Although various implementations are described with reference to the user identification engine 250 executing on a server 300-*b* at the cloud computing site 300, the implementations can be extended to the user identification engine 250 executing on a computing device that is local to a client device that is used to access the user account of the adult user to access the various content.

Details of the various modules and functions of each module will be described in detail with reference to FIG. 2.

Figure 2:
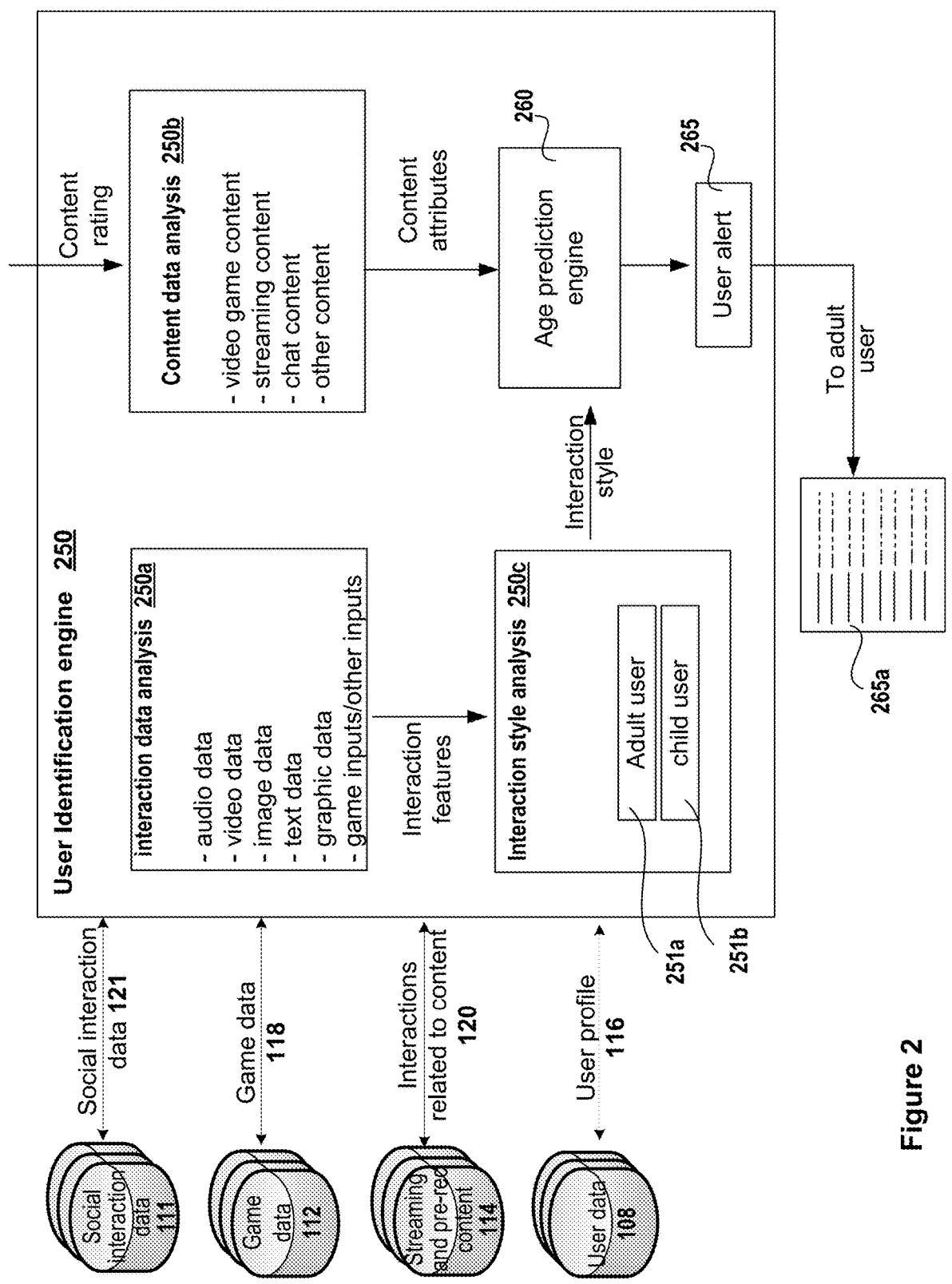
FIG. 2 illustrates various modules of a user identification engine used for detecting a child accessing adult content from the user account of an adult user, in accordance with one implementation of the present disclosure.

FIG. 2 illustrates an example user identification engine 250 that can be executed by a computing system. As noted above, the computing system can be a stand-alone computer, game console, or be part of a network (local area network (LAN), wide area network (WAN), metropolitan area network (MAN), etc.). The user identification engine 250 includes a plurality of modules and is configured to detect a user accessing a user account of an adult user and to determine user characteristics. The user characteristics can be identified from data obtained from sensors or from interactions provided by the user when accessing content via the user account of the adult user. The user characteristics are used to determine if the user is a child or an adult. In addition to determining user characteristics, interactions provided by the user at the user account are analyzed to determine interaction features. The interaction features are used to determine an interactive style of the user, which can be used to determine or confirm certain ones of the user characteristics, such as user identification, user age, user expertise, etc., of the user accessing the user account of the adult user. For example, the user can be a user unknown to the adult user or can be a new user whose user characteristics are not known to the adult user. The new user could have gained access to the user account of the adult user via forced entry (i.e., through hacking), or could be legitimately accessed using access data shared by the adult user. Consequently, in order to determine the user characteristics of the new or unknown user, the interactions of the new user are tracked and an interaction style of the new user is established. The interaction style of the new user is matched against the interaction style of other users identified from prior interaction sessions. Based on the level of match, the user characteristics of the new user are deduced from the user characteristics of the other users. In alternate implementations, the user can be a known user with a known interaction style. Even for the known user, the interactions of the user are tracked to, (a) confirm the interaction style of the user, or (b) to refine the interaction style based on changes detected in the interactions of the user. The established/refined interaction style can be used to confirm the user characteristics of the user.

The content accessed by the user is also analyzed to identify the content attributes. The content attributes are used to determine if the content is adult-related content. The user characteristics are used to predict an age of the user and the content attributes used to determine whether the content accessed by the user is appropriate for their age. When the content is deemed inappropriate for the age of the user, an alert is provided to the adult user detailing the user characteristic of the underage user and the content attributes of the content accessed by the underage user. The alert, in some implementations, may be provided in substantial real-time. In alternate implementations, the alert may be provided at pre-defined periods or upon detecting certain amount of activities at the user account. For example, the alert can be provided once every 12 hours or once every day, or upon detecting certain number of users or accesses detected at the user account. Responsive to the alerts, the adult user can make necessary corrections in their account's settings to prevent the underage user from accessing inappropriate content. Alternately, the adult user can use the details included in the alert to warn the underage user to avoid accessing certain content available to the user account.

The various modules of the user identification engine 250 are used to determine interaction features from user interactions and content attributes of content accessed by the user to keep track of content accessed from the user account of the adult user by the different users. Some of the modules includes interaction data analysis engine 250a, content data analysis engine 250b, interaction style analysis engine 250c and age prediction engine 260. The various engines can be a hardware component or a software component. In some implementations, one or more of the modules that are software components can be implemented as machine learning algorithm that is executed by a artificial intelligence (AI) processor to determine the user characteristics and to predict the age of the user accessing the content via the user account of the adult user so that appropriate alerts can be generated to the adult user. In alternate implementations, some of the modules can be implemented as hardware components of an application specific integrated circuit (ASIC). Functional details of each module will now be described with reference to FIG. 2.

The interaction data analysis engine 250a retrieves interactions provided by a user accessing content via a user account of an adult user and analyzes the interactions to identify interaction features. As noted above, an adult user can set up a user account to access different content available locally or over a network, such as the Internet. During setup of the user account, the adult user can provide user credentials, such as name, age, gender, etc. Alternately or additionally, the user may permit various sensors associated with the client device of the user to capture additional characteristics, such as biometric identification characteristics, etc. The characteristics of the adult user can be stored in a user profile 116 within user datastore 108, and used for verifying every time the adult user or any other user accesses the user account of the adult user. The user account is setup for accessing different content, including generic content and adult-related content, wherein the content can be streaming content, pre-recorded content, sponsored content, game content, social interactions, etc.

In addition to providing user credentials, the adult user can also set up the user account to be accessed by a plurality of users. The plurality of users who are allowed to access the user account can be other adult users, or a combination of adult users and child users. A child user is defined to be one whose age is determined to be below a pre-defined age. For example, the adult user is considered to be someone who is 18 years or older, and the child user is considered to be someone younger than 18 years. While setting up the user account, the adult user can also set up one or more types of content and specific content within each type that each user is allowed to access. The type of content can be identified based on the rating of the content, wherein the rating can be provided by a content provider or the adult user. For instance, the content, such as game content or streaming content, may be rated as adult content by a content provider or the adult user based on type of content included within, such as violence, adult or inappropriate language, sexual content, gory scenes, etc. Details of the other users authorized to access the content can be stored in the user profile 116 of the adult user as well as in the respective user profile of the other users.

When a user accesses the user account of the adult user to interact with some available content, user credentials provided by or captured of the user are used to verify that the user is authorized to access the user account of the adult user. The user can be the adult user who is the owner of the user account or can be another adult user or a child user. The verification is done by verifying the user credentials provided by or captured of the user during the access of the user account against the user credentials saved in the user profiles of the adult user and of other users that are authorized to access the user account of the adult user. When the user credentials match with that of one of the users that are authorized to access the user account, then the user is allowed access to the user account. Access to the user account includes access to appropriate content available at the user account. The content that is available to the user is based on the user credentials of the user.

Sometimes, the user may not provide their user credentials when accessing the user account of the adult user. This can happen when the user bypasses user verification and accesses the user account of the adult user. The user can gain access to the adult user's account in a deceptive way, or via the user account that was logged in but left unattended by an authorized user. Alternately, the adult user may share access to the user account with a remotely located guest user to allow the guest user to access the content viewed by the adult user. The aforementioned ways for gaining access are provided as examples and that other ways for gaining access to the user account of the adult user by the user can also be envisioned. In the absence of user credentials of the user to verify the user accessing the user account of the adult user, the user identification engine 250 relies on the user interactions provided within the user account to determine if the user accessing the user account is the adult user or a child or an impostor. Since the user account can be accessed by either authorized users or unauthorized users, the user identification engine 250 relies on the user interactions provided at the user account to verify that an authorized user is accessing the user account of the adult user and to ensure that the user is accessing the appropriate content.

An interaction data analysis engine 250a of the user identification engine 250 is engaged to monitor and analyze the user interactions at the user account to determine the interaction style of the user. The user interactions can vary depending on the type of content that the user is accessing and interacting with. For example, the user can select a video game and provide game inputs to generate game data. In another example, the content may be streaming content or social interaction content, and the interaction can be chat interactions or social interactions provided when viewing the streaming content or interacting with social media applications. The interaction data analysis engine 250a, depending on the type of content accessed by the user, retrieves and analyzes the appropriate interaction data from the respective datastores (game data 118 from game datastore 112, social interactions data 121 from social interaction datastore 111, interactions related to streaming/pre-recorded content 120, etc.) to determine the interaction style.

The interactions provided by the user can be in any form including audio data, video data, image data provided by or captured of the user interacting with the content, text data, graphic data, game inputs, and other inputs. These inputs are provided to affect a state of the content (e.g., game state of the video game, state of streaming content, etc), or as comments, or as instructions to other users to perform certain tasks within or in relation to the content, etc. For example, the user may be a spectator viewing streaming content and their interactions can be instructions to another user capturing the streaming content to adjust the view of capture so that the spectator can get a better view of the streaming content. Alternately, the user may be providing instructions as a series of inputs to a player playing a video game to guide the player to achieve a certain task. The different forms of interactions are provided as inputs by the user or captured from the one or more sensors associated with the client device used for interacting with the content. For example, the text data, the graphic data, the game input, etc., may be provided using input devices, such as controllers, keyboards, mouse, etc. Alternately, the game inputs can be provided as voice commands/audio instructions. The voice commands/audio instructions, in some implementations, are captured using one or more microphones available within the client device or disposed within the environment where the user is interacting with content, wherein the microphones disposed in the environment are coupled to the client device. The image data can be captured by one or more cameras coupled to the client device, in some implementations. The social interaction data can be generated from chat sessions, for example, while the user is interacting with the video game or other streaming or pre-recorded content.

The user interactions at the content are stored in the respective datastores. The interaction data analysis engine 250a of the user identification engine 250 executing on the client device or on a computing device that is coupled to the client device is configured to retrieve the various interactions generated by or captured for the user from the respective datastores. The interactions are analyzed to determine the various features associated with the interactions. For example, the interaction data analysis engine 250a can obtain and analyze the audio data of the user captured through the microphones to determine the audio features, such as frequency and amplitude. Based on the audio features, the interaction data analysis engine 250a can determine if the user is a child or an adult user. For example, the voice of a child is usually of higher frequency while the adult user is of lower frequency. Additionally, the audio data can be converted to text using a speech-to-text converter component and the text analyzed by the interaction data analysis engine 250a to determine the choice of words used and correlate the choice of words to a known specific user's interaction style, for example. For instance, it can be determined that the words included in the audio data are slang words that are most likely used by a child rather than an adult user. Additionally, the word choice included in the audio data can be known to be used by child 2, for example. The audio features are provided as input to interaction style analysis engine 250c.

Similarly, the video data captured of the user interacting in a physical space can be used by the interaction data analysis engine 250a to determine video features, such as expressions, actions typically taken, gestures provided, etc. Alternately, the video data can be provided by the user as part of the interactions and include an avatar or icon performing certain actions or expressions. These video features are provided as inputs to Interaction style analysis engine 250c. Image data captured of the user can be used to determine facial and/or other biometric features, which are provided as input to the interaction style analysis engine 250c. Text data provided through input devices or through voice commands and converted to text using speech-to-text converter component are also analyzed to determine choice of words to define expressions, type of comments provided, presence or absence of certain keywords, use of slang words to define expressions, etc. The interaction features identified from text data are provided as input to the interaction style analysis engine 250c. As with the image data, the graphic data, such as graphical user interface elements (GIFs), Memes, etc., are also analyzed to determine graphical features, such as expressions conveyed, choice of GIFs used, frequency of such GIFs/Memes used by user during their interactions, preferred GIFs/Memes used, etc. These graphical features are also provided to interaction style analysis engine 250c for further processing. Game inputs provided during game play of a video game are analyzed to determine game input features, such as type and speed of inputs provided, preference of inputs, type of challenges attempted, game challenges attempted, etc. In addition to game inputs, the user can be providing other inputs on a chat interface or on an interaction interface shared with other players or spectators. The other inputs can include text, GIFs, Memes, graphics, audio, etc., provided via chat interface or interaction interface rendered in relation to the video game content. The various features associated with game inputs and other inputs are identified and provided as inputs to the interaction style analysis engine 250c for further processing.

The interaction data analysis engine 250a can include different parsers and feature extractors to parse and extract the key components from the various different inputs provided by the user during their interactions with the content accessed via the user account of the adult user. The extracted features are forwarded to an age prediction engine 260 to predict an age of the user accessing the user account of the adult user. The age of the user is predicted using just the user interactions, when the user has not provided any age related data when accessing the user account of the adult user.

In addition to analyzing the interactions provided by the user to identify various features, the user identification engine 250 analyzes content accessed by the user to determine the type of content being accessed, the rating factor of the content, context, etc. As noted, the content can relate to video games, streaming content, pre-recorded content, chat content or any other content available for user consumption at the user account of the adult user. The content data analysis engine 250b is engaged to determine the type of content being used and to retrieve the content rating for the content available to the user account. The content rating can be provided by content rating agency, content provider or a user, wherein the user can include the adult user. Where there are no content ratings available, the content data analysis engine 250b can itself analyze the content and provide a rating based on the context, the type and amount of each type of content included within the content. The rating determines the suitability of the content to a viewer (i.e., the user). The content attributes identified by the content data analysis engine 250b are provided as inputs to an age prediction engine 260.

The interaction features identified from the different types of interactions are processed by interaction style analysis engine 250c to determine the interaction style of the user. The interaction style of each user can be distinct based on content type preference, preference in the type of interactions, amount and frequency of interactions, details included in the interactions, etc. Even when two users select the same content, each user may interact with the selected content in different ways. For example, a first user may prefer to interact with the content using text data on a chat interface while a second user may prefer to interact via audio data. Further, the choice of words of the first user may be very different from that of the second user. The interaction style analysis engine 250c processes the interaction features obtained from the analysis of the users' interactions to determine interaction style of the user and to initially broadly classify the interaction style of the user as that of an adult user 251a or a child user 251b. For example, the audio features identified from the audio data of the user can indicate that the voice belongs to a child instead of an adult. Game inputs received from the user during gameplay of a video game can be similarly processed to determine if the user is an adult user or a child user. The interaction style of the user is provided as input to age prediction engine 260.

The age prediction engine 260 can engage a machine learning algorithm to process the content attributes and the interaction style to predict an age of the user currently interacting with the content. The prediction can be done by comparing the interaction style of the user to interaction style of other users that previously interacted with the content. The interaction style of each other user who interacted with the same or similar content during prior interaction sessions are stored in one or more datastores and retrieved to determine the interaction style of the current user. The interaction style of each of the other users can be different for different content and for different context of the same content. For example, the interaction style of a first user established from interactions captured when the first user interacted with streaming content (i.e., a non-video game content) was determined to be of a first style. The interaction style of the first user established from game inputs (i.e., interactions) provided by the user as a player, during prior game play sessions of a video game, was determined to be of a second style. The interaction style of the first user established from social interactions provided as a spectator during prior game play sessions of the same video game was determined to be of a third style. The difference in interaction style can be, for example, due to the fact that the first user, as a player, showed a more aggressive side as an experienced player as they played the video game, while, as a spectator, showed a more patient and less aggressive side as they were providing assistance to another player (e.g., a novice player) by way of gameplay hints (i.e., a sequence of game inputs) to guide the novice player through a challenge within the video game. Similarly, the first user could have expressed a different interaction style when they interacted with other users via a chat interface, than when they provided game inputs when they played the video game. Thus, based on the type of content (e.g., streaming content, chat content, video game, etc.), context of the interaction (e.g., game inputs as a player/comments as a spectator), nature of the role the first user assumed when providing interactions, etc., the type of interactions provided by the first user can be different. Consequently, the first user can be associated with different interaction styles. The age prediction engine 260 processes the different interaction styles associated with the first user to predict the age of the first user. In cases where the age of the first user was provided as part of user characteristics, the age prediction engine 260 can reconfirm the age of the user by processing the different interaction styles established from the interactions of the first user. Further, confirmed age of the first user and the interaction styles of the first user can be used for predicting age of other users.

To predict the age of the current user, the age prediction engine 260 uses the interaction style of the current user established from the interactions of the current user by the interaction style analysis engine 250c and compares the established interaction style against the interaction style of other users. As noted above, the interaction style of any user can vary based on the context and the type of content that the user accesses and interacts with. The age prediction engine 260, when predicting the age of the current user, takes into consideration the context and the content as well as the role assumed by the user providing the interactions when matching the interaction style of the current user with that of a specific user whose age is already known. Based on the level of correlation of the interaction style of the current user with that of a specific user whose age is already known, the age of the current user can be easily predicted. When the age of the current user indicates that the user is a child (i.e., a minor), then the content attributes of the content accessed by the current user is evaluated. If the current attributes indicate that the content is age-appropriate for viewing/interacting by a child/minor, then the user identification engine 250 allows the current user to proceed to interact with the content. If, however, the current user is a child/minor, then a user alert 265 is initiated. The user alert 265 is forwarded to the adult user associated with the user account to inform the adult user that a child is currently accessing content that is inappropriate for their age. In some implementations, the alert is initiated as and when a child is detected to be accessing the content (i.e., real-time) that is appropriate for the adult user and inappropriate for the child. The real-time alert may be generated, in some implementations, based on the type of content being accessed by the child, age of the child, context of the content included, amount of inappropriate content included, etc.

In alternate implementations, the alert can be generated for pre-defined periods (e.g., every 12 hours or 24 hours) or for pre-defined number of accesses to the adult content detected from the same child user or other child users, using interaction data stored in the different datastores. The alert can be generated to include a list 265a of child users that were detected to access the adult content via the user account of the adult user. The list could include such details as the child user identifier, the type of content accessed, time when the content was accessed, resident time at the content, etc. The list can be generated to include the child users access in chronological or reverse chronological order, or in alphabetical order of the child users, or in content order, or any other order as seemed fit. In alternate implementations, the list can be sorted in accordance to age of the user accessing the content. In yet another implementation, the list can be sorted in accordance to resident time at the content, severity of adult content included, etc. Additional or alternate alerts can be issued to the adult user in a format that is different from the list format. In some implementations, the alert can be in audio format. The audio alert can be provided to warn the user of the age of the child accessing the content of the adult user. In some implementations, based on the severity of the adult content that is being accessed and the age of the user (i.e., child), the alert can be provided in both audio as well as real-time alert/alert list.

FIG. 3A illustrates one such example of a list of users that have accessed inappropriate content via the user account of the adult user. The list details the users that have accessed the content that is inappropriate for their age. The list can include details, such as the content identifier of the inappropriate content, content rating, time of access, resident time, interactions provided by the user and type of alert generated. In some cases, the user can be below the age limit that declares the user as a child. However, the age of the user can be just shy of the age limit cut-off. For example, as shown in FIG. 3A, user C1 is 17 years old and could be few days or weeks from reaching 18 years, which can result in the user C1 being declared an adult. As a result, when the user identification engine 250 encounters the user C1 accessing content that is reserved for adult users, the user identification engine 250 can realize that user C1 is just shy of turning 18. As a result, the severity of the action of user C1 accessing the adult content would be considered low due to the age of the user. Consequently, the alert related to the user C1 accessing the inappropriate content is provided in a list generated periodically (e.g., once every 12 hours or 24 hours). In some cases, user C1 might be a minor/child and has accessed the adult content. However, the access to the adult account could have been an accident. The child upon determining that they have mistakenly accessed the adult content, they would have switched the content to appropriate content. This is substantiated by the resident time (10 seconds) of the child at the adult content. In response to detecting the short duration of access to the adult content, the user identification engine 250 detects the fleeting access and includes such access in the list that is sent to the adult user as part of the pre-defined periodic alert. In some implementations, the list can be generated and provided to the adult user as and when the system detects the adult user accessing their user account. In these implementations, the list is generated on-the-fly and provided to the adult user instead of the pre-defined periodic alert.

FIG. 3B illustrates an alternate way of alerting the adult user, in some implementations. In these implementations, the system may detect a child accessing the adult content based on the interaction features and the content attributes of the content accessed by the child. Based on the age of the child, the context of the content, severity of inappropriate content included therein, the system can generate an urgent warning to the adult user to inform them that a child is accessing the adult content. FIG. 3B illustrates one such warning message generated as part of alerting the adult user. The warning is generated in substantial real-time upon detecting the child accessing the content and can include the time stamp of such access. The types of alerts illustrated in FIGS. 3A and 3B are provided as mere examples and other forms of alerting the adult user can also be envisioned.

Responsive to the alert, the adult user can take actions such as adjusting the setting of the user account to ensure that each user accessing the adult user's account are provided access to content that is appropriate for their age. The adult user can take additional action of warning the child from accessing the adult content so as to ensure that the child is not exposed to content that is beyond their age level.

The various implementations provide ways to predict the age of a user who has not provided any user characteristic data that can be used to determine the age of the user. In such cases, the system predicts the age of the user by comparing the interaction style of the user against interaction styles of other users stored in the interaction history datastores, wherein the age of the other users is known to the system. The comparison is to identify a specific user or specific set of users whose interaction style substantially matches the interaction style of the user. For example, game inputs provided to a video game by a user during gameplay are used to identify the interaction style of the user. The interaction style of the user is matched against the interaction style of other users to predict certain ones of the user characteristics, such as age, skill level, input capabilities, user interest, etc., so that an appropriate alert can be issued to the adult user. The constant monitoring of the user account is done to ensure that the user account is not misused by other users and to prevent the users from getting exposed to age-inappropriate content. Other advantages will be realized by one skilled in the art after reading the various implementations of the disclosure.

Figure 4:
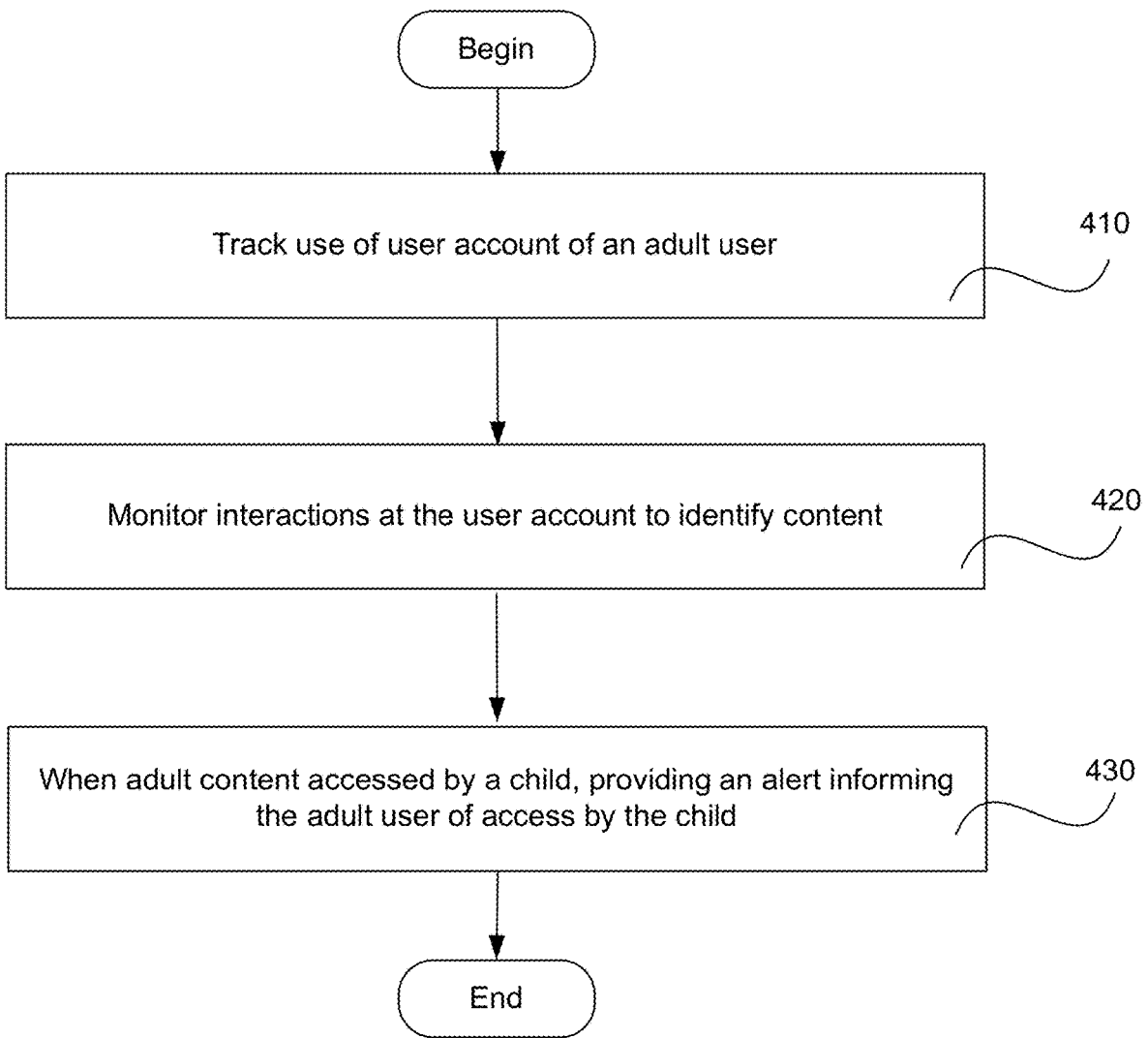
FIG. 4 illustrates a simplified flow of operations of a method for monitoring a user account of an adult user and alerting the adult user when a child accesses an age-inappropriate content from the user account of the adult user, in accordance with one implementation of the present disclosure.

FIG. 4 illustrates flow operations of a method for warning an adult user of a misuse of their user account, in one implementation. The method begins at operation 410, wherein the user account of an adult user is tracked. The user account is set up by an adult user and is used to access a plurality of content, including adult and generic content. The user account is configured to be accessed by a plurality of users. The adult user can be a parent or head of a household and the user account can be set up to stream content available over a network, such as the Internet. Interactions generated at the user account of the adult user are monitored, as illustrated in operation 420. The interactions at the user account can be generated by a plurality of users accessing different content. The interactions are analyzed to determine interaction style of the user and the interaction style is used to predict the age of the user.

A prediction engine is engaged to analyze the interactions to determine the interaction style of the user and to compare the interaction style of the user against the interaction styles of other users stored in the history (i.e., interaction data-stores). In some implementations, the interaction style of the user can vary depending on the type of content that is being accessed and the role assumed by the user when interacting with the type of content. For example, the type of content accessed by the user can be a video game, and the user can assume the role of a player or a spectator. The game inputs (i.e., interactions) provided by the user as a player can be different from the interactions provided by the user as a spectator. The interaction style of the user can thus be predicted based on the type of content and the nature of interactions. Based on the level of match of the interaction style of the user with the interaction styles of other users, the user characteristics of the user, such as age, skill level, etc., are predicted using the user characteristics of the other users. The user characteristics are then used to determine if the content accessed by the user is age-appropriate.

The method then flows to operation 430, wherein when the content accessed by a particular user is adult content and the user is determined to be a child, an alert is generated to warn the adult user of the content accessed by the child. The predicted age of the user and the content attributes are used to determine if the content accessed by the user is appropriate for the user's age or not. When the content is appropriate for the age of the user, the system allows the user to continue to consume the content. However, when the system determines that the content accessed is not age-appropriate, the system generates the alert to the adult user. The adult user can use the alert to take appropriate steps to prevent the child from accessing the age-inappropriate content.

Figure 5:
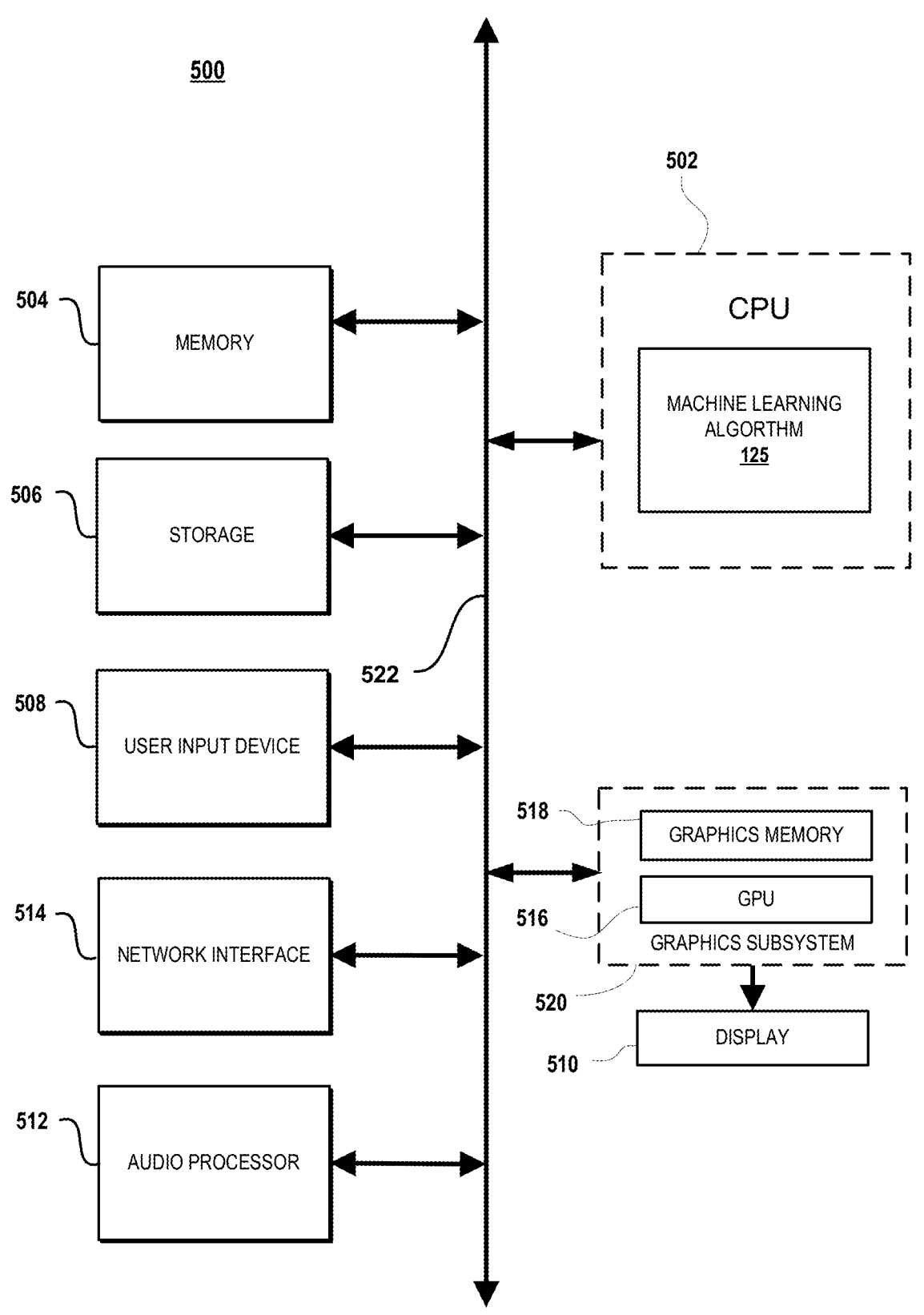
FIG. 5 illustrates components of an example computing device that can be used to perform aspects of the various implementations of the present disclosure.

FIG. 5 illustrates components of an example computing device 500 that can be used to perform aspects of the various embodiments of the present disclosure. This block diagram illustrates computing device 500 that can incorporate or can be a personal computer, video game console, personal digital assistant, a head mounted display (HMD), a wearable computing device, a laptop or desktop computing device, a server or any other digital device, suitable for practicing an embodiment of the disclosure. For example, the device 500 represents a first device as well as a second device in various implementations discussed herein. Device 500 includes a central processing unit (CPU) 502 for running software applications and optionally an operating system. Further, the CPU 502 can include machine learning algorithm 125 with an object recognition algorithm (not shown) embedded therein to use the physical attributes captured for the real-world object in order to identify the real-world object. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be localized to a player playing a game segment (e.g., game console), or remote from the player (e.g., back-end server processor), or one of many servers using virtualization in a game cloud system for remote streaming of game play to client devices.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 514, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. In addition to display device 510, the pixel data can be projected onto a projection surface. Device 500 can provide the display device 510 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play/replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD, the real-world objects, and inertial sensor data from the Inertial Motion Unit (IMU) sensors, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

As noted, embodiments of the present disclosure for communicating between computing devices may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for warning misuse of a user account of an adult user, comprising:
  tracking use of the user account of the adult user, the user account configured to provide access to a plurality of content including one or more video games to a plurality of users;
  monitoring, by at least using an application associated with a video game platform and configured to record user activity logs, interactions at the user account to identify content accessed by said plurality of users;
  analyzing, using a machine learning model, interaction data corresponding to said plurality of users and including data generated by one or more sensors associated with the video game platform;
  identifying, by the machine learning model, an interaction style exhibited by a user of the plurality of users based on user inputs including at least one of game input patterns or text interaction data;
  determining, by the machine learning model, that the user is a minor based on the identified interaction style; and
  when the content accessed by a user of the plurality of users is adult content and the user is determined to be a minor based on the interaction style, providing an alert via the application to inform the adult user of the minor accessing the adult content via said user account.

2. The method of claim 1 wherein monitoring interactions includes identifying select ones of interactions that correspond to said user of the plurality of users accessing the user account,
  wherein said select ones of interactions include the text interaction data, or the game input patterns provided to one or more content accessed from the user account of the adult user.

3. The method of claim 2, wherein monitoring interactions further includes,
  analyzing said text interaction data, or included in said select ones of the interactions to identify interaction style of said user, the interaction style being specific to said user and used in determining said user is the minor.

4. The method of claim 2, wherein monitoring said interactions includes analyzing the game input patterns included in said select ones of the interactions relating to said user to identify characteristics used to determine age of said user.

5. The method of claim 1, wherein the alert is provided to the adult user in substantial real-time, in response to detecting the minor accessing the adult content from the user account of the adult user.

6. The method of claim 1, wherein the alert is provided to the adult user every time the adult user accesses the user account.

7. The method of claim 6, wherein the alert provided to the adult user includes a list of users of the plurality of users that have accessed the adult content via said user account and details of the adult content accessed by each user included in said list of users, wherein said each user in the list of users is identified as a distinct minor.

8. The method of claim 7, wherein the list excludes the user of the user account.

9. The method of claim 1, wherein the one or more video games includes a video game that is designated as inappropriate for the minor, based on the content included in the video game, by a game developer or a game provider or a game sponsor or said adult user, and wherein said interactions of the minor include game input to the video game or social interactions provided on an interaction interface rendered in relation to content of the video game, or expressed interest of viewing the video game as a spectator.

10. The method of claim 9, wherein the game input or the social interactions used to distinctly identify the user as the minor accessing the video game based on an interaction style included therein.

11. The method of claim 1, wherein the plurality of content includes a streaming content that is designated as inappropriate for the minor, and wherein the alert is provided to the adult user describing a type of interaction provided by the minor for the streaming content.

12. The method of claim 1, wherein the alert to the adult user includes a type of content being accessed for viewing.

13. The method of claim 1, wherein the user account is a shared account, and the alert includes details of the accessed content and the interaction style of the minor user.

14. A server for warning misuse of a user account of an adult user, comprising:

a memory coupled to a processor and used to store operations executed by the processor;

the processor configured to execute the operations to:

track use of the user account of the adult user, the user account configured to provide access to a plurality of content including one or more video games to a plurality of users;

monitor, by at least using an application associated with a video game platform and configured to record user activity logs, interactions at the user account to identify content accessed by said plurality of users;

analyze, using a machine learning model, interaction data corresponding to said plurality of users and including data generated by one or more sensors associated with the video game platform;

identify, by the machine learning model, an interaction style exhibited by a user of the plurality of users based on user inputs including at least one of game input patterns or text interaction data;

determine, by the machine learning model, that the user is a minor based on the identified interaction style; and when the content accessed by a user of the plurality of users is adult content and the user is determined to be a minor based on the interaction style, provide an alert via the application to inform the adult user of the minor accessing the adult content via said user account.

15. The server of claim 14, wherein the processor is further configured to, identify select ones of interactions that correspond to each user of the plurality of users accessing the user account, and analyze said select ones of interactions to identify interaction style of said user, the interaction style being specific to said user and used in determining said user is a minor.

16. The server of claim 15, wherein said select ones of interactions include the text interaction data, or the game input patterns provided to one or more content accessed from the user account of the adult user.

17. The server of claim 16, wherein said processor is configured to analyze said text interaction data, the game input patterns provided included in said select ones of the interactions to identify interaction style of said user.

18. The server of claim 16, wherein said processor is configured to analyze the game input patterns included in said select ones of the interactions relating to said user to determine age related metrics in order to establish the user as the minor.

19. The server of claim 14, wherein the alert is provided to the adult user every time the adult user accesses the user account.

20. The server of claim 14, wherein the alert provided to the adult user includes a list of users of the plurality of users that have accessed the adult content designated as inappropriate for each user included in the list, and details of the adult content accessed by said each user in said list, wherein each user in said list is identified as a distinct minor.

* * * * *